United States Patent [19]

Natarelli, Jr. et al.

[11] 3,900,535

[45] Aug. 19, 1975

[54] TOXIC PHOSPHORUS COMPOUNDS

[75] Inventors: Gerard E. Natarelli, Jr., Bel Air, Md.; Frank G. Pinto, Middlesex, N.J.; Jacob I. Miller, Baltimore, Md.

[73] Assignee: The United States of America as represented by the Secretary of the Army, Washington, D.C.

[22] Filed: Mar. 13, 1963

[21] Appl. No.: 265,594

[52] U.S. Cl. ................. 260/945; 260/999; 424/211

[51] Int. Cl.[2] ........................................... C07F 9/28

[58] Field of Search ..................... 260/461.310, 945; 167/30 H

[56] References Cited

FOREIGN PATENTS OR APPLICATIONS 665,315 1/1952 United Kingdom ................ 260/945

*Primary Examiner*—Leland A. Sebastian

*Attorney, Agent, or Firm*—Nathan Edelberg; Robert P. Gibson; Robert W. Church

EXEMPLARY CLAIM

1. A new chemical toxic agent

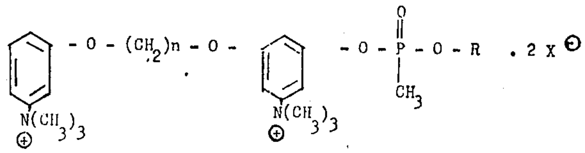

where R is an alkyl group, where n is from 1 to 10, and where $X^-$ is selected from the group consisting of

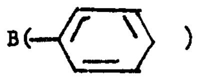

$4^{\ominus}$ and $I^{\ominus}$.

7 Claims, No Drawings

TOXIC PHOSPHORUS COMPOUNDS

The invention described herein may be manufactured and used by or for the Government of the United States of America for governmental purposes without the payment to us of any royalty thereon.

This invention relates to a series of new compounds that are extremely useful as chemical warfare agents.

These compounds are toxic because they have been shown to be extremely potent inhibitors of cholinesterase, and they cause death at very low dosages. In addition, these compounds give evidence that they are resistant to the standard atropine-oxime therapy for anticholinesterase poisoning.

These compounds can be shown generically as follows:

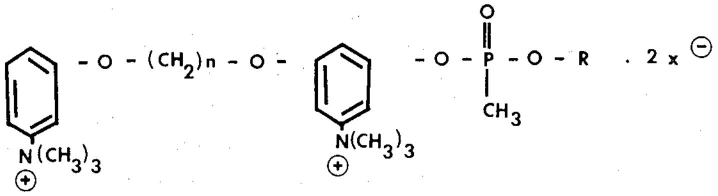

where R is an alkyl group, where n is 1 to 10, and where X⁻ is selected from the group consisting of

4⊖ and I⊖.

A schematic diagram of the step-by-step preparation of these compounds is as follows:

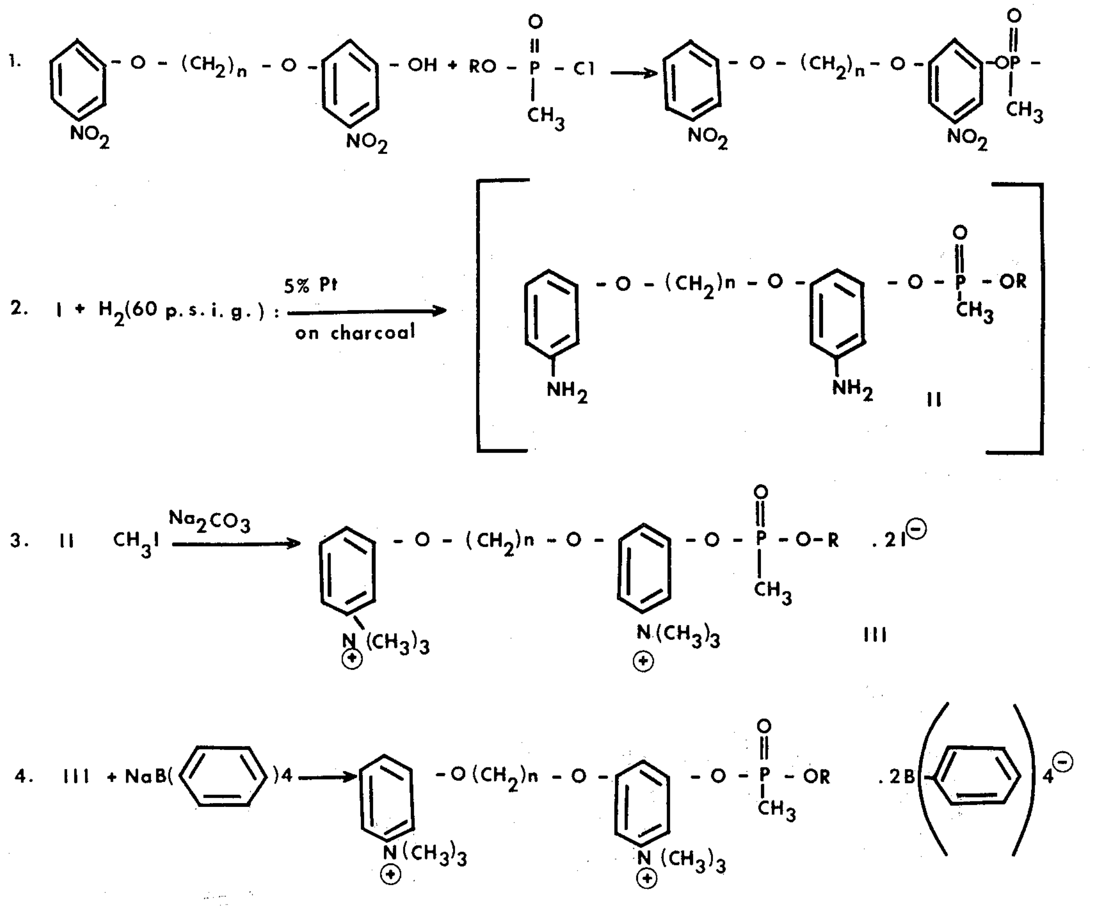

In more detail, the preparation of the dimethiodide of 3- 3-(m-dimethylaminophenoxy)propoxy -5-dimethylaminophenyl pinacolyl methylphosphonate (called compound EA 2613) is as follows:

STEP 1. The Preparation of 3- 3-(m-Nitrophenoxy)-propoxy -5-nitrophenyl Pinacolyl Methylphosphonate.

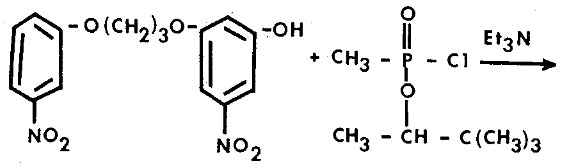

I II

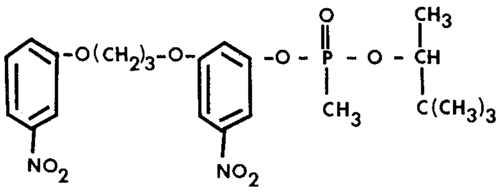

III

To a stirred suspension of 3.34 g. (0.01 moles) of 1-(3-nitrophenoxy)-3-(3-hydroxy-5-nitrophenoxy)propane (I) in 50 ml. of dry hexane was added a solution of 1,01 g. (0.01 moles) of dry triethylamine in 10 ml. of dry hexane. The mixture was heated to reflux on a steam bath in an attempt to enhance the solution of the phenol. To the stirred, refluxing mixture was added a solution of 2.0 g. (0.01 m) of pinacolyl methylphosphonochloridate (II) in 10 ml. of dry hexane. After the addition, which required one-half hr., the reaction mixture became cloudy. The stirred mixture was then refluxed for 3 hrs., cooled, and filtered to yield the theoretical amount of solid triethylamine hydrochloride. The filtrate was then stripped of solvent under reduced pressure to yield a small quantity of a yellow oil which would not crystallize. This oil was redissolved in 50 ml. of benzene and washed, in the order shown, with 50 ml. each of cold water, cold 1 N aqueous sodium hydroxide, and cold water. The benzene solution was then dried over "Drierite" and stripped of solvent under reduced pressure. The residual yellow oil was pumped down to 2 $\mu$Hg. and heated at 150° for 2 hr. This oil was found to analyze well for the expected product III. A small sample decomposed without distillation at 220°/2 $\mu$.

Anal. Calcd. for $C_{22}H_{29}N_2O_9P$: C, 53.2; H, 5.9; N, 5.6.

Found: C, 53.3; H, 5.9; N, 5.7.

STEP 2. The Preparation of 3-[3-m-Aminophenoxy)-propoxy]-5-animophenyl Pinacolyl Methylphosphonate.

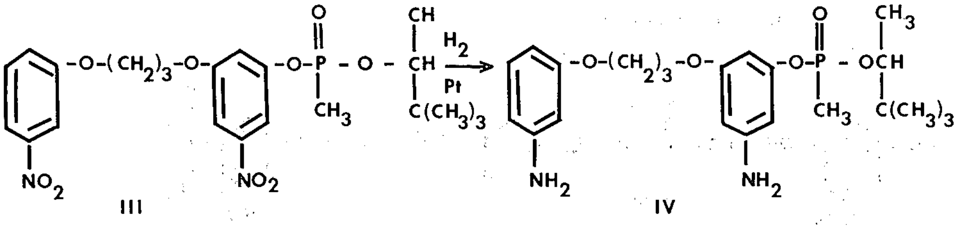

III IV

A solution of 2.2 g. (0.0044 moles) of 3-[3-(m-nitrophenoxy)propoxy]-5-nitrophenyl pinacolyl methylphosphonate (III) in 50 ml. of absolute ethanol was reduced in a Paar apparatus over a 5% platinum on charcoal catalyst at 60 p.s.i.g. the theoretical amount of hydrogen was taken up in 3 hrs. The mixture wea filtered free of catalyst and the clear yellow alcoholic solution was used immediately in the subsequent quaternization.

STEP 3. The Preparation of the Dimethiodide of 3-[3-(m-Dimethylaminophenoxy)propoxy]-5-dimethylaminophenyl Pinacolyl Methylphosphonate.

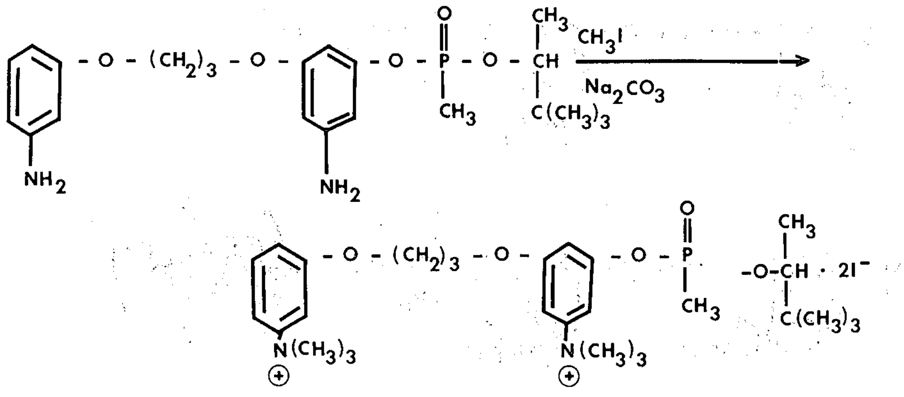

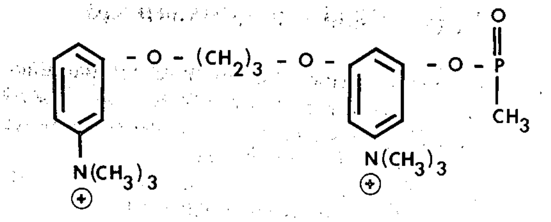

The alcoholic solution of 3-[3-(m-aminophenoxy)-propoxy]-5-aminophenyl pinacolyl methylphosphonate (IV) was placed in a round bottomed flask and mixed with 19 g. (0.132 moles, a 5 molar excess) of methyl iodide and 3.7 g. (0.035 moles, twofold excess) of sodium carbonate. The mixture was stirred at room temperature for 1 day and refluxed gently for 2 days. The hot reaction mixture was filtered free of carbonates and the solvent was removed from the clear orange filtrate under reduced pressure.

The tan solid residue was treated with chloroform to separate the insoluble sodium iodide from the desired product. The sodium iodide was removed by filtration. The chloroform filtrate was evaporated to dryness under reduced pressure and the crude tan solid product was recrystallized from ethanol-ethyl acetate to yield 0.8 g. of a fine yellow powder, m.p. 124°–126°.

Anal. Calcd. for $C_{28}H_{47}N_2O_5PI_2$: C, 43.3; H, 6.1

Found: C, 43.2; H, 6.2.

The preparation of the dimethotetraphenylboronate salts of these compounds was accomplished by pouring a concentrated aqueous solution of the desired dimethiodide, with vigorous swirling into a solution of sodium tetraphenylborate. The product precipitated immediately as an extremely fine white powder that was filtered with difficulty. Recrystallization of these crude products was accomplished by preparing a saturated solution of the desired crude compound in acetone, and pouring this, with vigorous swirling, into a large volume of cold water. Allowing the resulting mixture to stand overnight at room temperature enhanced the coagulation of the precipitated product, which could then be filtered and dried at room temperature.

The compounds that have been prepared and tested are listed below by code number, name and chemical structure. The physical and chemical properties and the physiological data are summarized in the inclosed table.

EA 2012 3-[4-(m-Dimethylaminophenoxy)butoxy]-5-dimethylaminophenyl Isopropyl Methylphosphonate Dimethotetraphenylboronate

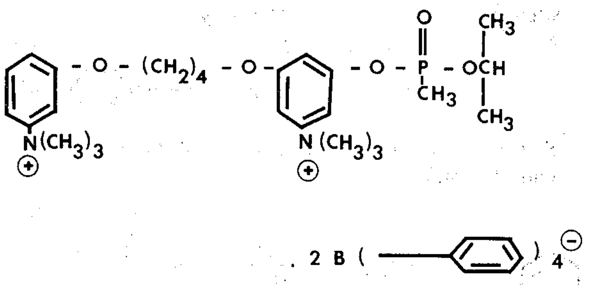

EA 2054 3-[3-(m-Dimethylaminophenoxy)propoxy]-5-dimethylaminophenyl Isopropyl Methylphosphonate Dimethotetraphenylboronate

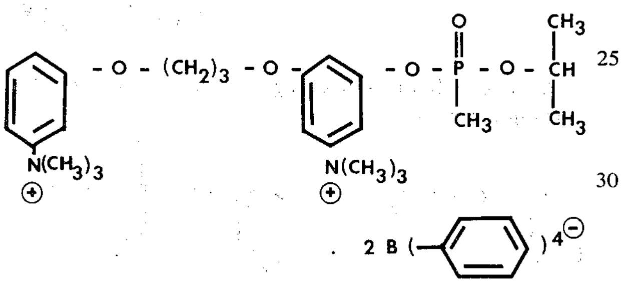

EA 2098 3-[3-(m-Dimethylaminophenoxy)propoxy]-5-dimethylaminophenyl Ethyl Methylphosphonate Dimethotetraphenylboronate

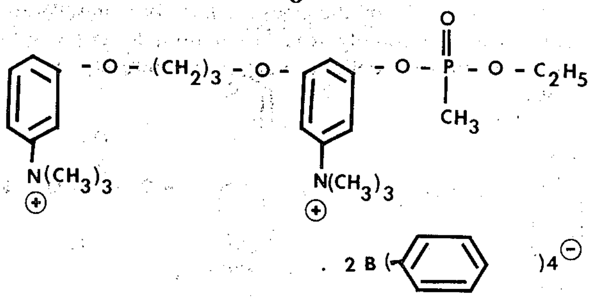

EA 2613 3-[3-m-Dimethylaminophenoxy)propoxy]-5-dimethylaminophenyl Pinacolyl Methylphosphonate Dimethiodide

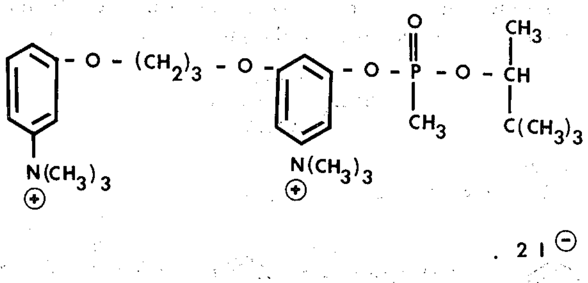

The names of the compounds reported in this application are those which conform to current standards of nomenclature as outlined by Chemical Abstracts. The names used in these Laboratories are names which emphasize the homologous nature of this series of compounds, and the general name for the phosphonate esters is:

$\alpha$-(3-Dimethylaminophenoxy)-$\omega$-(3-dimethylamino-5-alkyl-methylphosphonophenoxy)alkane Dimethiodide.

The physical and toxic properties of these compounds are shown by the following chart:

| Code Number | Empirical Formula | Molecular weight | Melting point °C | Analysis Solubility | Calculated for C | H | N | Found C | H | N | IV $LD_{50}$ µg/kg. Rats | Rabbits |
|---|---|---|---|---|---|---|---|---|---|---|---|---|
| EA 2012 | $C_{74}H_{83}B_2N_2O_5P$ | 1133.04 | 171–172 | Sol. ac Insol. $H_2O$ | 78.4 | 7.5 | 2.5 | 78.3 | 7.5 | 2.5 | 93 | 17 |
| EA 2054 | $C_{73}H_{81}B_2O_5N_2P$ $H_2O$ | 1119 | 97–100 | Sol. ac Insol. $H_2O$ | 77.1 | 7.36 | | 77.3 | 7.34 | | 74 | 15 |
| EA 2098 | $C_{72}H_{79}B_2O_5N_2P$ | 1105 | 108–111 | Sol. ac Insol. $H_2O$ | 78.3 | 7.2 | | 78.7 | 7.3 | | 20 | 6.7 |
| EA 2613 | $C_{28}H_{47}N_2O_5PI_2$ | 776.5 | 124–126 | Sol. $H_2O$ alc, ac $CHCl_3$ | 43.3 | 6.1 | | 43.2 | 6.2 | | 100 | 12 |

N.B.
µg = microgram
Kg = Kilogram weight of the animal
$LD_{50}$ = the dosage required to kill 50% of the animals
ac = acetone
alc = alcohol
$CHCl_3$ = chloroform It is evident from the above chart that these compounds are extremely toxic to mammals and would therefore make excellent chemical warfare agents.

We claim:

1. A new chemical toxic agent

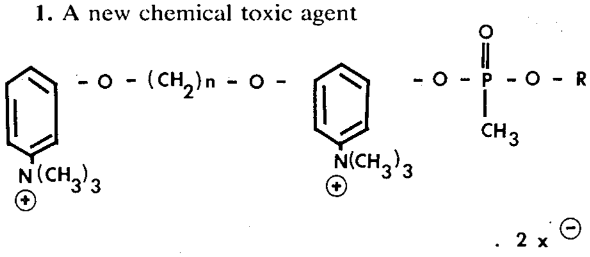

where R is an alkyl group, where n is from 1 to 10, and where $X^-$ is selected from the group consisting of

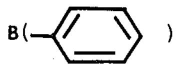

$4^{\ominus}$ and $I^{\ominus}$.

2. A new chemical toxic agent

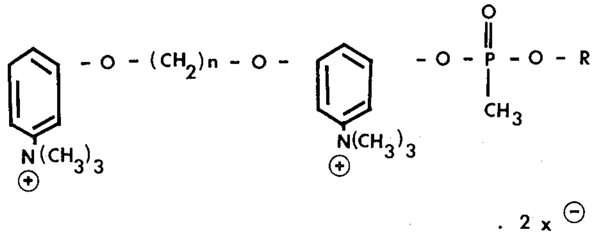

where R is ethyl, where n is from 1 to 10, and where $X^-$ is selected from the group consisting of

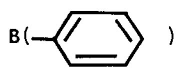

$4^{\ominus}$ and $I^{\ominus}$.

3. A new chemical toxic agent

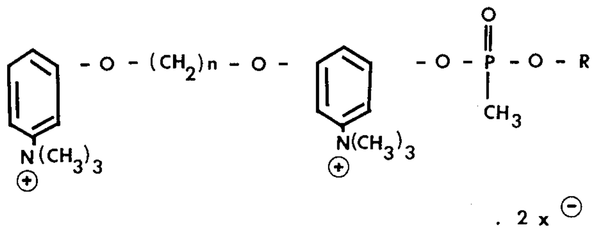

where R is isopropyl, where n is from 1 to 10, and where $X^-$ is selected from the group consisting of

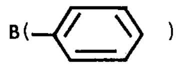

$4^{\ominus}$ and $I^{\ominus}$.

4. A new chemical toxic agent as set forth by the following formula

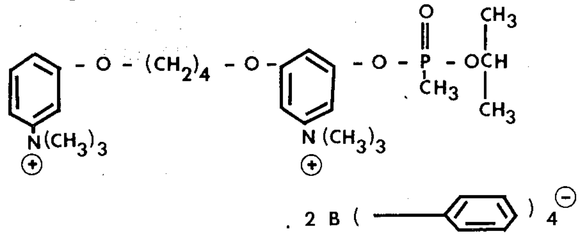

5. A new chemical toxic agent as set forth by the following formula

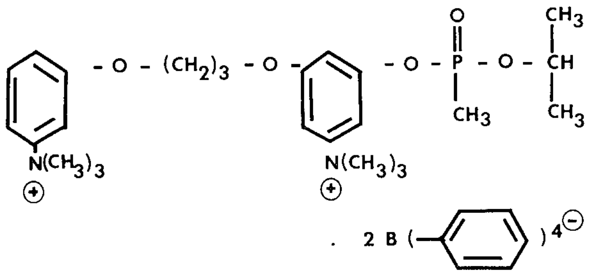

6. A new chemical toxic agent as set forth by the following formula

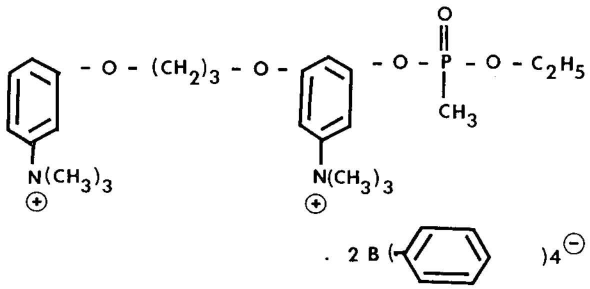

7. A new chemical toxic agent as set forth by the following formula

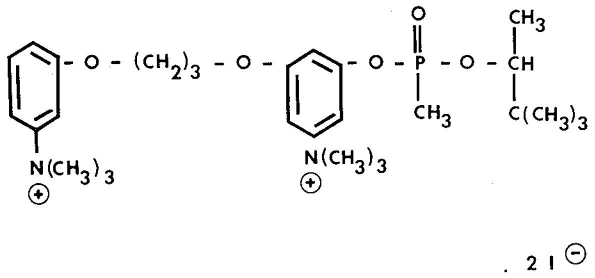

* * * * *